(12) United States Patent
Banat et al.

(10) Patent No.: US 10,751,692 B2
(45) Date of Patent: Aug. 25, 2020

(54) CALCIUM ALGINATE ADSORBENTS

(71) Applicant: Khalifa University of Science and Technology, Abu Dhabi (AE)

(72) Inventors: Fawzi Banat, Abu Dhabi (AE); Priyabrata Pal, Abu Dhabi (AE); Anjali Achazhiyath Edathil, Abu Dhabi (AE)

(73) Assignee: Khalifa University of Science and Technology, Abu Dhabi (AE)

( * ) Notice: Subject to any disclaimer, the term of this patent is extended or adjusted under 35 U.S.C. 154(b) by 0 days.

(21) Appl. No.: 16/062,445

(22) PCT Filed: Dec. 16, 2015

(86) PCT No.: PCT/IB2015/059664
§ 371 (c)(1),
(2) Date: Jun. 14, 2018

(87) PCT Pub. No.: WO2017/103654
PCT Pub. Date: Jun. 22, 2017

(65) Prior Publication Data
US 2019/0001300 A1    Jan. 3, 2019

(51) Int. Cl.
| | |
|---|---|
| *B01J 20/24* | (2006.01) |
| *B01J 20/12* | (2006.01) |
| *B01J 20/20* | (2006.01) |
| *B01D 15/08* | (2006.01) |
| *B01D 15/26* | (2006.01) |
| *B01J 20/34* | (2006.01) |
| *B01J 20/10* | (2006.01) |
| *B01J 20/26* | (2006.01) |

(Continued)

(52) U.S. Cl.
CPC ............ *B01J 20/24* (2013.01); *B01D 15/08* (2013.01); *B01D 15/265* (2013.01); *B01J 20/103* (2013.01); *B01J 20/12* (2013.01); *B01J 20/20* (2013.01); *B01J 20/267* (2013.01); *B01J 20/28047* (2013.01); *B01J 20/3085* (2013.01); *B01J 20/3475* (2013.01); *B01J 41/20* (2013.01); *C08B 37/0084* (2013.01); *B01J 2220/42* (2013.01); *B01J 2220/4825* (2013.01); *B01J 2220/52* (2013.01); *B01J 2220/58* (2013.01)

(58) Field of Classification Search
None
See application file for complete search history.

(56) References Cited

U.S. PATENT DOCUMENTS 5,207,830 A *   5/1993   Cowan ................ A01K 1/0154
                                                          106/672
6,989,102 B1 *   1/2006   Park ........................ B01J 20/20
                                                           210/679

(Continued)

*Primary Examiner* — Chester T Barry
(74) *Attorney, Agent, or Firm* — Steven M. Shape; Dennemeyer & Associates, LLC

(57) ABSTRACT

A method of treating a liquid for removal of organic acid anions which comprises contacting a liquid containing organic acid anions with an adsorbent comprising calcium alginate-kaolinite or calcium alginate-quartz and a method of treating a liquid for removal of organic acid anions, heavy metal ions and thermally degraded organic products which comprises contacting a liquid containing organic acid anions, heavy metal ions and thermally degraded organic products with an adsorbent comprising calcium alginate-activated carbon are described.

8 Claims, 5 Drawing Sheets

(51) Int. Cl.
*B01J 20/28* (2006.01)
*B01J 20/30* (2006.01)
*B01J 41/20* (2006.01)
*C08B 37/00* (2006.01)

(56) References Cited

U.S. PATENT DOCUMENTS

2010/0173772 A1\* 7/2010 Robinson ................ B01J 20/20
  502/402
2017/0151365 A1\* 6/2017 Dubey .................... A61L 15/18

\* cited by examiner

CALCIUM ALGINATE ADSORBENTS

CROSS-REFERENCE TO RELATED APPLICTIONS

This is a 35 U.S.C. 371 National Stage Patent Application of International Application No. PCT/IB2015/059664, filed Dec. 16, 2015, which is hereby incorporated by reference in its entirety.

The present invention is based on the ongoing project "Deterioration of Solvent Quality and Foaming Problems in a Gas Sweetening Unit" which is carried out at The Petroleum Institute, Abu Dhabi. The project was started from January 2012 under Prof. Fawzi Banat as Principle Investigator and is expected to be completed by the end of December 2015. The invention provides adsorbents for removing contaminants including organic acid anions, heavy metal ions and thermally degraded organic products from fluids, especially from lean methyldiethanolamine (MDEA) solution (also named lean MDEA herein), methods using such adsorbents as well as particular uses of such adsorbents.

BACKGROUND

Natural gas sweetening using aqueous methyldiethanolamine (MDEA, 45-50 weight %) is currently used by e.g. GASCO Company (Habshan, Abu Dhabi) to scrub $H_2S$/$CO_2$. The rich MDEA solution is fed to a regeneration column where heat is applied to strip the acid gas components to get back the lean MDEA solution. In this absorption process, formate, acetate, propionates etc. as organic acid anions are formed by the reaction between aerial oxygen and $H_2S$ and $CO_2$. The reactions between these anionic species and protonated MDEA forms heat stable salt (HSS), which cannot be removed from the solvent by heating in the regenerator. Continuous accumulation of these HSS in the MDEA solvent deteriorates its quality to lower its absorption capacity.

Another serious concern of the unit are the other major contaminants like heavy metal ions, arising mostly from corrosion and erosion of process equipment and accumulating in the lean MDEA solvent. Some heavy metal ions might come from the demineralized water added as make-up water to maintain the concentration of lean MDEA solution from time to time. Moreover, MDEA thermally degrades to organic compounds like diethanolamine (DEA), bicine etc. Therefore, regeneration of MDEA is inevitable for the industry. Thus, an adsorbent containing calcium alginate hydrogel with filler like kaolinite, quartz or activated carbon was prepared to remove those contaminants from lean MDEA using batch as well as column studies.

The conventional methods for removal of total contaminants from lean MDEA have been preceded by using the ion exchange resin, separation membrane, etc. It has been proposed to remove heat stable salts from lean alkanolamine solution by ion exchange resins. For example, at the 2014 AIChE Annual meeting, an abstract was presented (see e.g. http://www3.aiche.org/proceedings/Abstract.aspx?PaperID=367797) discussing a base polymeric material which however showed stability problems when used in trials.

Further, U.S. Pat. Nos. 2,797,188, 4,122,149, 4,170,628, 4,477,419, 4,758,311, 4,795,565, 4,970,344, 4,999,113, 5,006,258, 5,162,084, 5,277,822 and 5,788,864 etc. described the removal of heat stable salt anions removal by exchange with hydroxide ions from an anion exchange resins and cations, such as sodium and potassium, by hydrogen ion from a cation exchange resins.

However, in case of the removal using ion exchange resin or separation membrane, it is difficult and expensive to treat the polluted lean MDEA containing a lot of heat stable salt anions, heavy metal ions and thermally degraded organic compounds as contaminant. Though, removal of heavy metal ions like chromium or iron were not described anywhere. Despite the foregoing developments, there is significant room for improvement in the art.

SUMMARY OF THE INVENTION

It is an object of the present invention to provide a method which allows easily, effectively and substantially totally removing organic acid anions from a particular fluid by using an adsorbent, which organic acid anions are considered impurities of the fluid.

It is another object of the present invention to provide a method which allows easily, effectively and substantially totally removing organic acid anions, heavy metal ions and thermally degraded organic products from a particular fluid by using an adsorbent, which organic acid anions, heavy metal ions and thermally degraded organic products are considered impurities of the fluid.

It is another object of the present invention that the adsorbent used in the inventive methods can be prepared in a simple, reliable and efficient manner.

It is another object of the present invention that the inventive methods can be carried out by using standard and preferably on-site equipment.

It is particular object of the present invention to achieve all the objects explicitly mentioned and implicitly contained in the specification of this invention for the case that the treated liquid at least comprises or eventually consists of methyldiethanolamine and more specifically aqueous methyldiethanolamine which is used in natural gas sweetening.

In order to achieve one or more of the mentioned objects, the present invention provides a method of treating a liquid, preferably methyldiethanolamine, for removal of organic acid anions which comprises contacting a liquid containing organic acid anions, preferably methyldiethanolamine containing organic acid anions, with an adsorbent comprising calcium alginate-kaolinite (CAK) or calcium alginate-quartz (CAQ).

It is preferably for this method of the present invention that the adsorbent is prepared by a process comprising adding drop-wise a mixed solution of alginate and kaolinite or quartz to a calcium chloride solution, thereby cross linking alginate with calcium ions and finally getting the adsorbent.

In a preferred embodiment, the method of the present invention comprises passing of said liquid containing organic acid anions, preferably methyldiethanolamine containing organic acid anions, through a column containing said adsorbent in gel form.

In order to achieve one or more of the mentioned objects, the present invention further provides a method of treating a liquid, preferably methyldiethanolamine, for removal of organic acid anions, heavy metal ions and thermally degraded organic products which comprises contacting a liquid containing organic acid anions, heavy metal ions and thermally degraded organic products, with an adsorbent comprising calcium alginate-activated carbon (CAC).

It is preferably for this method of the present invention that the adsorbent is prepared by a process comprising adding drop-wise a mixed solution of alginate and carbon powder to calcium chloride solution to form a carbon impregnated CAC adsorbent.

In another preferred embodiment, the method of the present invention comprises passing of said liquid containing organic acid anions, heavy metal ions and thermally degraded organic products, preferably methyldiethanolamine containing organic acid anions, heavy metal ions and thermally degraded organic products, through a column containing said adsorbent in gel form.

It is preferably for all methods of the present invention that the alginate is sodium alginate salt.

It is further and particularly preferably for all methods of the present invention that the treated liquid is methyldiethanolamine.

BRIEF DESCRIPTION OF THE DRAWINGS

The present invention will be described with reference to the accompanying drawings of which.

DETAILED DESCRIPTION OF THE INVENTION

Figure 1:
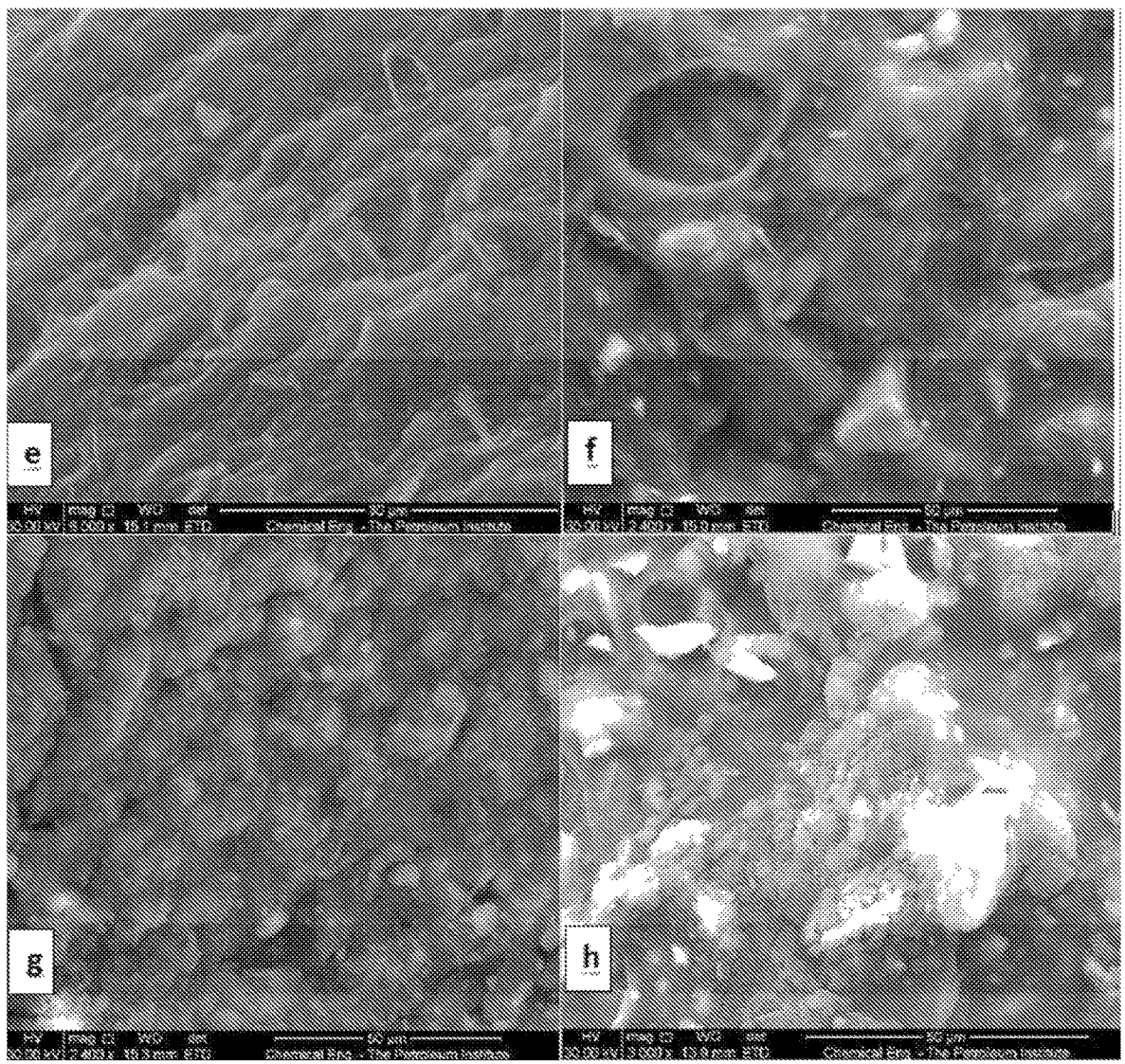
FIG. 1 is a scanning electronic microscope photograph enlarged to 1600 times the surface of alginate gel is alginate adsorbent in accordance with the Examples 1 of the present invention of CAK before (e) and after (f) and CAQ before (g) and after (h) adsorption studies.
Figure 2:
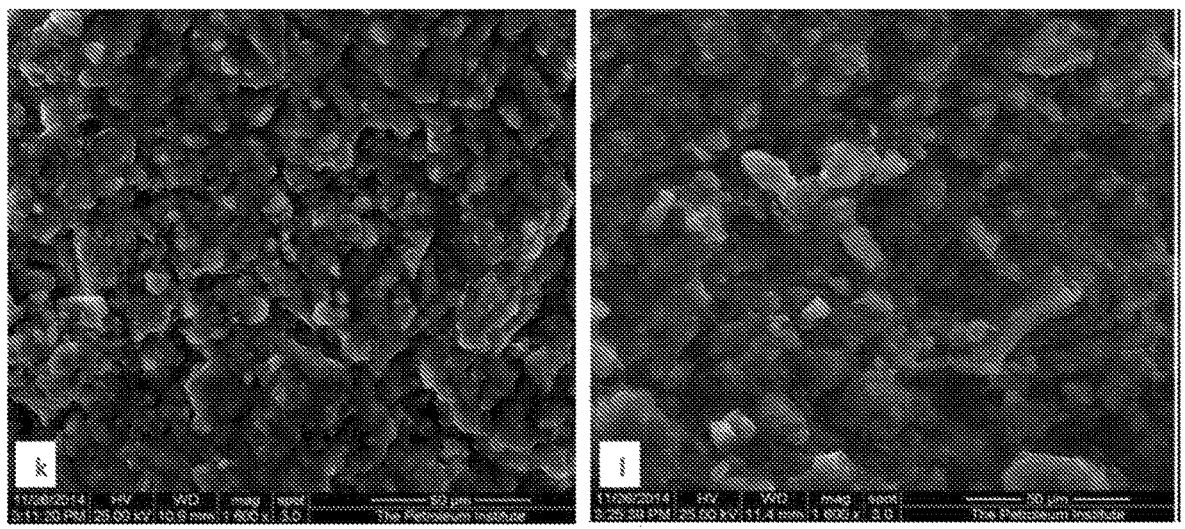
FIG. 2 is a scanning electronic microscope photograph enlarged to 1600 times the surface of alginate gel is alginate adsorbent in accordance with the Examples 2 of the present invention of CAC before (k) and after (l) adsorption studies.
Figure 3:
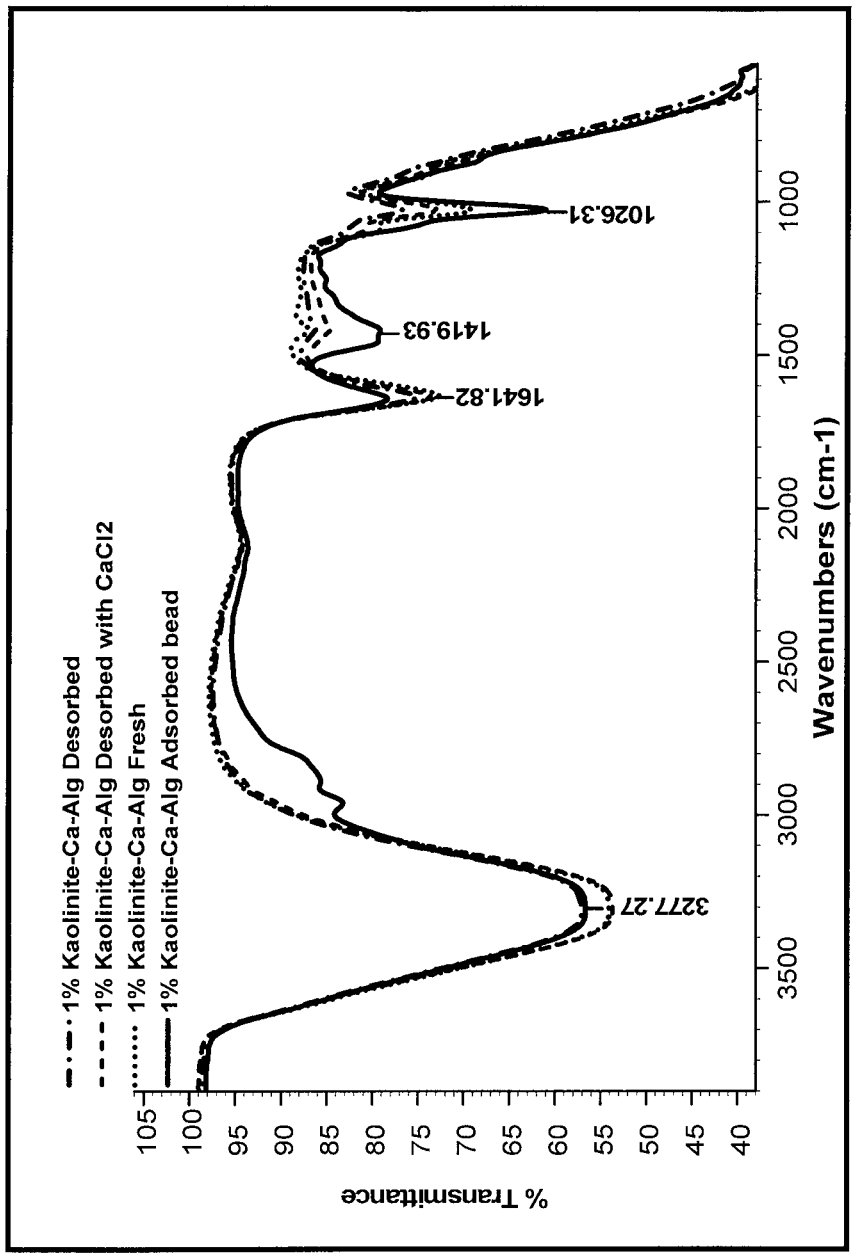
FIG. 3 is a FTIR Spectra in accordance with the Examples 1 of the present invention of calcium alginate beads containing fresh CAK, CAK after adsorbed and CAK after desorbed in fresh water and $CaCl_2$ solution.
Figure 4:
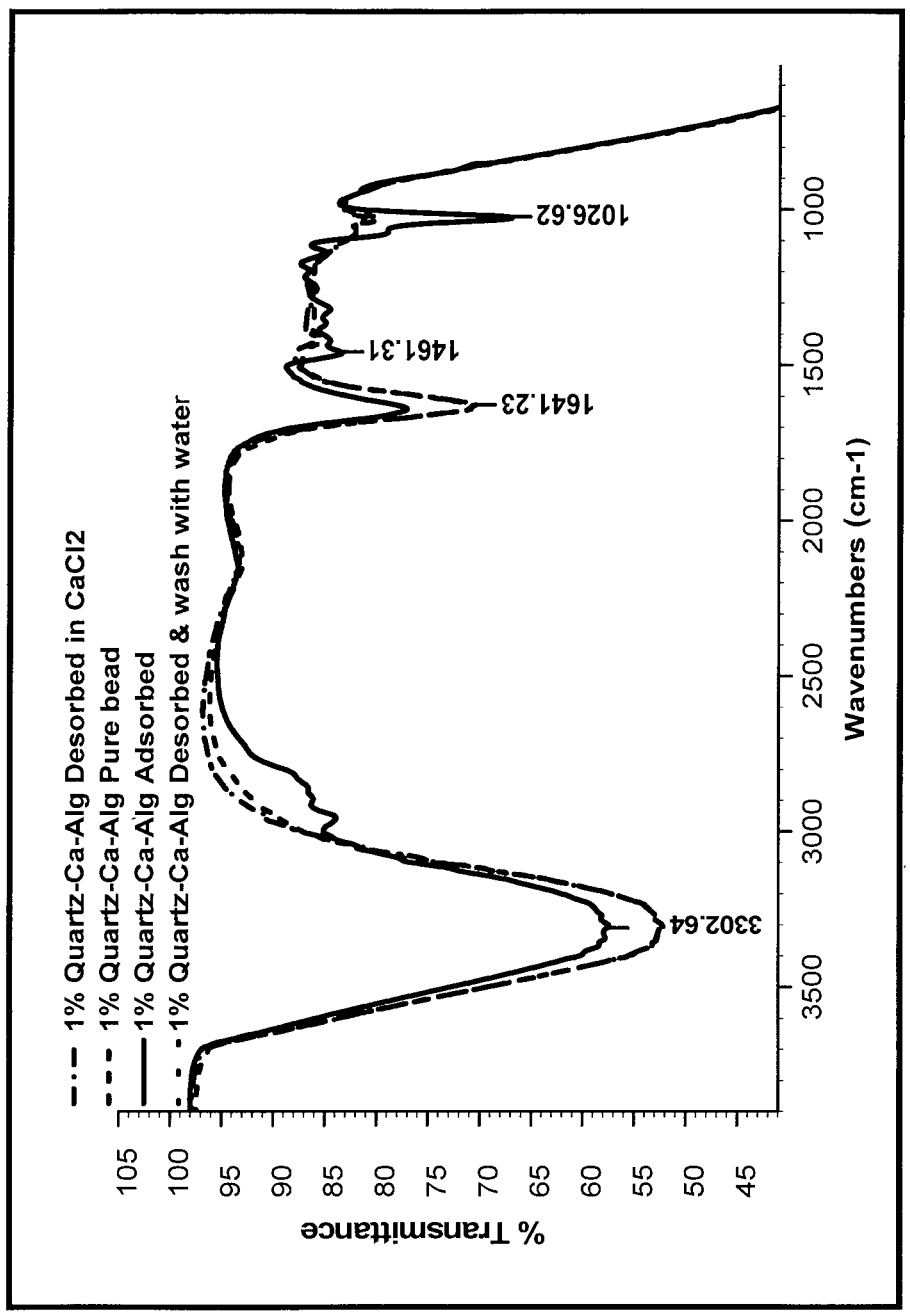
FIG. 4 is a FTIR Spectra in accordance with the Examples 1 of the present invention of calcium alginate beads containing pure CAQ, CAQ after adsorbed and CAQ after desorbed in fresh water and $CaCl_2$ solution.
Figure 5:
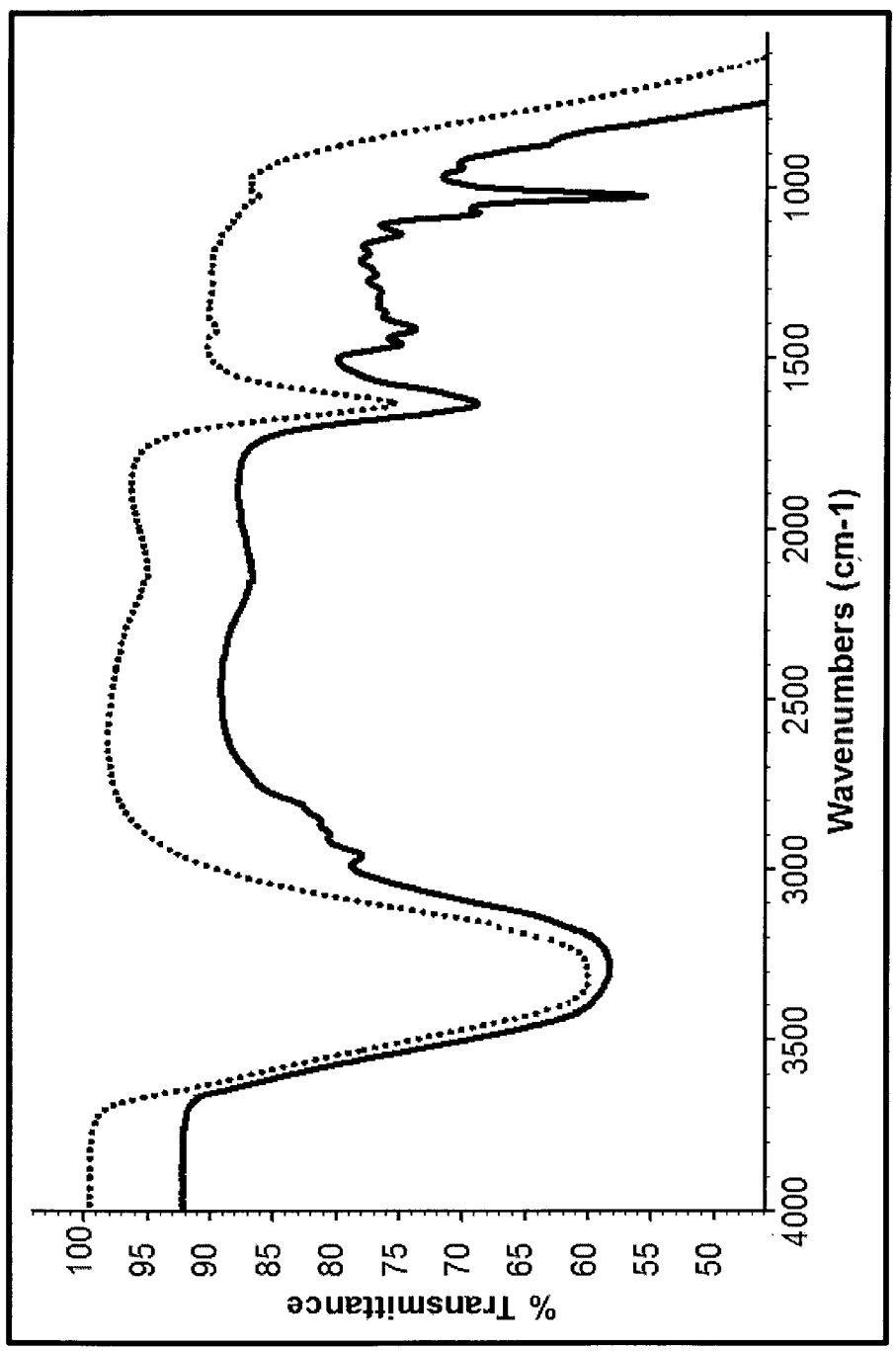
FIG. 5 is a FTIR Spectra in accordance with the Examples 2 of the present invention of calcium alginate beads containing 3% C containing CAC and after adsorbed.

Biopolymer such as alginate is used to remove total contaminants from lean methyldiethnolamine (MDEA) solvent. The MDEA solvent quality deteriorates abruptly while absorbing $H_2S/CO_2$ from natural gas and causes foaming in natural gas sweetening unit. Different types of organic as well as inorganic species are found to be present as contaminants in lean MDEA solvent. Heat stable salts are present in high amount in lean MDEA and detected using Ion Chromatograph and UV-VIS spectrophotometer. Substantial amount of elements (chromium, iron etc.) were detected using Inductively Coupled Plasma Optical Emission Spectrometry (ICP-OES) analysis. The organic acid anions such as acetate (2806 ppm), propionate (1305 ppm), butyrate (781.8 ppm), glycolate (317.3 ppm), formate (227.7 ppm) and valerate (246.5 ppm) were determined in lean MDEA from a particular batch using Ion-Chromatograph. The total organic acid content was found to be 5685 ppm (using Test kit 365, UV-VIS Spectrophotometer, Hach Lange). The major metal ions were determined using ICP-OES were found to be chromium (615.7 ppb) and iron (1114 ppb), respectively. Lean MDEA samples were collected time to time from the GASCO Company (Habshan, Abu Dhabi) and were analyzed with different concentrations of organic acid anions and metal ions content. The major organic degraded products obtained from lean MDEA were diethanolamine (DEA) (4 weight %, measured using liquid chromatography mass spectrometry), bicine etc.

Initially, calcium alginate gel with filler like kaolinite (CAK), quartz (CAQ) and activated carbon (CAC) beads were prepared and used as batch adsorption studies to monitor the removal of these contaminants from lean MDEA solvents. FTIR and SEM analysis were carried out to observe the principle of calcium alginate as adsorbent. Using equilibrium batch adsorption studies, total organic acid anions removal was found to be 13.17% for CAK, 14.64% for CAQ and 18.95% for CAC using 2.0 gm adsorbent. It was also observed that CAC removed heavy metal ions like chromium (25.19%) and iron (32.33%) significantly at room temperature. Carbon, used to prepare impregnated calcium alginate beads (CAC), were also used to check the removal efficiency of thermally degraded organics like DEA and it was observed that removal of DEA was 36.275%. Finally, the calcium alginates with filler as Kaolinite/Quartz/Carbon were prepared as composite material beads (named as CAK, CAQ and CAC) to study the continuous process in column.

Adsorption Mechanism:

According to the present invention, calcium alginate, a linear polymer as adsorbent, is capable of adsorbing organic acid anions and heavy metal ions from industrial lean methyldiethanolamine solvent. The adsorption mechanism of calcium alginate is shown in the following formula (I):

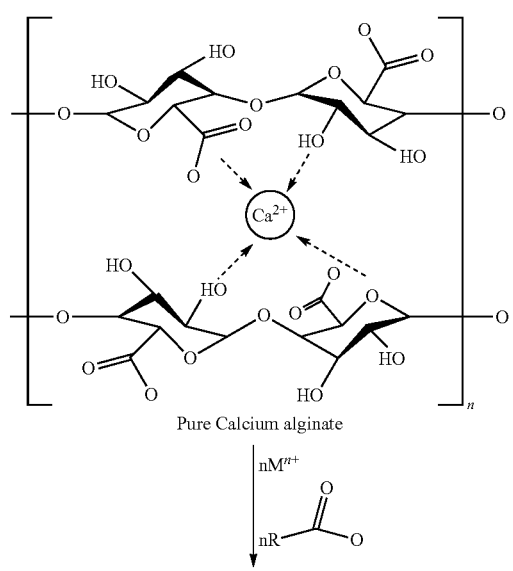

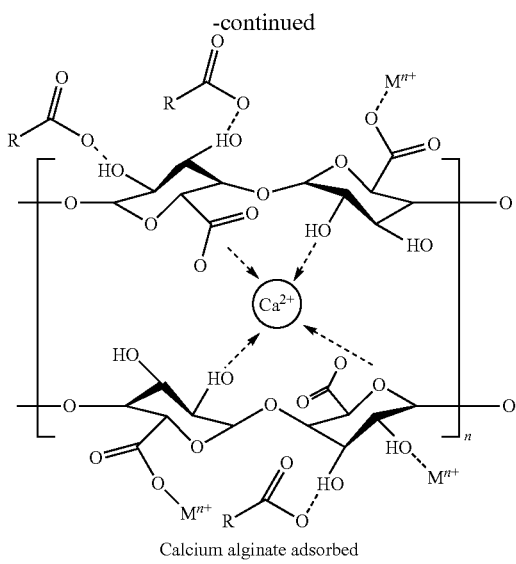

Calcium alginate adsorbed

In the developed calcium alginate adsorbent, the two functional groups namely, carboxyl (—COO) and hydroxyl (—OH) groups are present as the adsorption sites which helps in the removal of contaminants from lean MDEA. Carboxylic acids (R—COOH) present in the lean amine consists of carbonyl group (C═O) and hydroxyl groups (—OH), in which the —OH group is more strongly polarized than the O—H group of alcohol due to presence of adjacent carbonyl group, which in turn is responsible for the acid nature of these compounds and enhanced dipole strength. These dipoles allow these compounds to participate in energy favorable hydrogen bonding interactions by functioning both as H-bond donor and acceptor. Thus when the calcium alginate comes in contact with the lean MDEA during adsorption, a hydrogen bond (a weak secondary bonding) is formed between carboxyl group of fatty acids and the hydroxyl group of the alginate facilitating in the removal of organic acid anions contaminant from lean MDEA. The oxygen in the hydroxyl group of the alginate possesses a lone pair of electron, and hence has a tendency to bind a positively charged metal ion through electron pair sharing. The release of this lone pair from oxygen is not that easy and hence external conditions such as an increase in temperature of the adsorption environment may results in enhanced removal of metal ions through electron pair sharing. Also, the carboxyl groups (—COO—) which are present in alginate has more affinity towards positively charged metal ions and will form weak secondary bonds resulting in the removal of metal ions from lean MDEA solvents. With this consideration, the following adsorption reactions are proposed to explain the mechanism of total organic acid anion and heavy metal ions as shown in formula (I).

Regeneration Mechanism:

The regeneration of exhausted adsorbents is a significant economic factor in the application of adsorbents and it also decides the nature of the adsorption process. This process also explains the mechanism of adsorbents for regeneration, recycling and reusing of consumed adsorbents to save the environment from secondary pollution. Generally, concentrated sulfuric acid, hydrochloric acids are known to be the most effective desorbing agent to elute heavy metals from sorbents. Using sulfuric acid as an eluent resulted in the deterioration of the CAC beads due to the precipitation reaction take place between the calcium ion and the other heavy metal ions.

Highly concentrated salt solutions such as sodium chloride are also often used for the selective regeneration of ion exchangers with sodium but their regeneration efficiency is much lower than that of concentrated acids. Furthermore, a highly concentrated sodium chloride solution is not a suitable desorbing agent to regenerate saturated alginate beads as they are destroyed at high concentrations of sodium ions. Addition of controlled deionized water also showed good recovery efficiencies up to 5 cycles at room temperature. But at higher temperatures, the regeneration resulted in the deterioration of the adsorbent due to temperature difference. However desorption using water of same temperature conditions was a better choice; but recovery efficiency was reduced significantly up to 25% for 3 cycles.

In this present work, the organic acid anions and metal ions adsorbed on 2.0 gm of the CAC beads adsorbent were desorbed by washing thrice with 0.05% (w/v) $CaCl_2$. The adsorbed organic acid anions and heavy metal ions in the linear polymer was regenerated using calcium chloride solution and represented as the following formula (II):

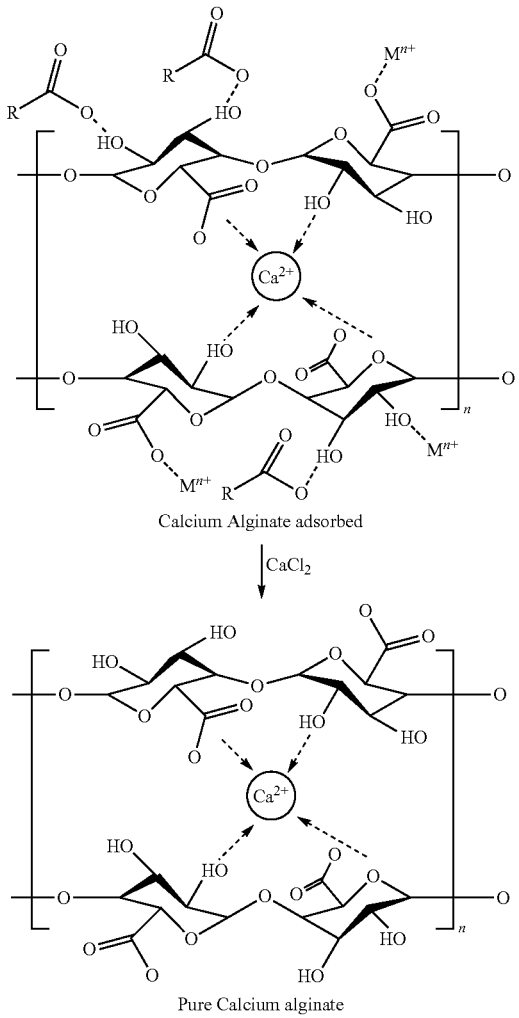

Calcium Alginate adsorbed

↓ $CaCl_2$

Pure Calcium alginate

As the standard reduction potential of $Ca^{2+}/Ca$ (−2.76 volts) is lower than the heavy metal ions like chromium and iron, calcium ion can replace the heavy metal ions from the adsorbed CAC beads and regenerate the bead to work as an adsorbent again. The adsorption capacity will be lowered after running few adsorption-desorption cycle as it was not possible to regenerate the calcium alginate adsorbent totally after each cycle.

Example 1

Preparation of Calcium Alginate-Kaolinite (CAK)/Quartz (CAQ) Hybrid Beads:

The Kaolinite/Quartz clay particles were first washed several times with distilled water to remove the metal impurities adhered, followed by drying at 80° C. for 24 hours. By the process of ionic gelation method, the Calcium Alginate-Kaolinite (CAK) hybrid gel beads were prepared by adding 1.0 weight % Kaolinite particles to 1.0 weight % sodium alginate solution and stirred overnight for complete homogenization. The solution was then added drop wise to 2.0 weight % $CaCl_2$ solution under constant stirring. The beads are collected from $CaCl_2$ after 24 hours to ensure complete polymerization and stored for further use. The Calcium Alginate-Quartz beads (CAQ) were also prepared in the similar manner as CAK with 1.0 weight % purified Quartz.

Example 2

Preparation of Calcium Alginate-Activated Carbon (CAC) Hybrid Beads:

Activated carbon particles were washed thoroughly with distilled water to remove the excess chemicals present and dried overnight at 105° C. The purified carbon particles were powdered to obtain particle size in between 25-100 μm and 1.0-5.0 weight % was added to alginate solution and stirred overnight for complete homogenization. Similarly, the solution was then added drop wise to 2.0 weight % $CaCl_2$ solution under constant stirring. The beads are collected from $CaCl_2$ after 24 hours to ensure complete polymerization and named as Calcium Alginate-Activated Carbon (CAC) beads and stored for further adsorption studies.

Example 3

Commercially available activated carbon (SGL Carbon, sieved to obtain particle sizes 1-2 mm) is used to prepare CAC beads. The sieved particles were washed with distilled water and dried in oven at 105° C. to remove organics which are found in the industrial lean MDEA solvent. Thus, selectively remove of secondary amine (Diethanolamine; DEA) from the mixture of MDEA found in natural gas sweetening plant. The work involves quantitative estimation of organics in MDEA solution at varying temperatures (23° C.-53° C.).

EXPERIMENTAL

Equilibrium Studies of Adsorption with Calcium Alginate-Kaolinite (CAK) Adsorbents:

The equilibrium studies for the removal of total organic acid anions were studied from batch adsorption experiments using mixed batch reactor technique. Varying amount of alginate beads (0.500-4.00 gm) were added into 10 ml lean MDEA solution taken in a 150 ml conical flask and allowed to equilibrate in a water bath shaker at 170 rpm at different temperatures ranging from 23° C.-53° C. for 4 hours. Table 1 shows the concentrations obtained for organic acid anions after equilibrium adsorption studies for CAK beads with lean MDEA from different batch (organic acid concentration, 3415 ppm).

TABLE 1

| | Weight of CAK, gm | | | | | |
|---|---|---|---|---|---|---|
| | 0.500 | 1.00 | 1.50 | 2.00 | 3.00 | 4.00 |
| Equilibrium conc. of total organic acids, ppm at 23° C. | 3290 | 3175 | 3065 | 2965 | 2785 | 2620 |
| Equilibrium conc. of total organic acids, ppm at 33° C. | 3280 | 3155 | 3035 | 2925 | 2740 | 2565 |
| Equilibrium conc. of total organic acids, ppm at 43° C. | 3270 | 3135 | 3005 | 2895 | 2695 | 2515 |
| Equilibrium conc. of total organic acids, ppm at 53° C. | 3255 | 3110 | 2975 | 2860 | 2640 | 2450 |

Equilibrium Studies of Adsorption with Calcium Alginate-Quartz (CAQ) Adsorbents:

Similarly, batch adsorption studies were performed using CAQ beads. Table 2 shows the concentrations obtained for organic acid anions after equilibrium adsorption studies for CAQ beads with lean MDEA from different batch (organic acid concentration, 3415 ppm).

TABLE 2

| | Weight of CAQ, gm | | | | | |
|---|---|---|---|---|---|---|
| | 0.500 | 1.00 | 1.50 | 2.00 | 3.00 | 4.00 |
| Equilibrium conc. of total organic acids, ppm at 23° C. | 3275 | 3145 | 3025 | 2915 | 2715 | 2545 |
| Equilibrium conc. of total organic acids, ppm at 33° C. | 3260 | 3120 | 2985 | 2865 | 2655 | 2475 |
| Equilibrium conc. of total organic acids, ppm at 43° C. | 3245 | 3090 | 2950 | 2820 | 2600 | 2405 |
| Equilibrium conc. of total organic acids, ppm at 53° C. | 3225 | 3060 | 2900 | 2765 | 2525 | 2325 |

Equilibrium Studies of Adsorption with Calcium Alginate-Activated Carbon (CAC) Adsorbents:

Similarly, batch adsorption studies were performed using CAC beads. Table 3a shows the concentrations obtained for organic acid anions and Table 3b shows the concentrations obtained for chromium and iron after equilibrium adsorption studies for CAC beads with lean MDEA from different batch (organic acid concentration, 5460 ppm; chromium, 391.8 ppb and iron, 847.1 ppb).

TABLE 3a

| | Weight of CAC, gm | | | | |
|---|---|---|---|---|---|
| | 0.500 | 1.00 | 1.50 | 2.00 | 5.00 |
| Equilibrium conc. of total organic acids, ppm at 23° C. | 5200 | 4990 | 4765 | 4425 | 3495 |
| Equilibrium conc. of total organic acids, ppm at 33° C. | 5195 | 4860 | 4695 | 4450 | 3465 |
| Equilibrium conc. of total organic acids, ppm at 43° C. | 5195 | 4785 | 4645 | 4470 | 3440 |
| Equilibrium conc. of total organic acids, ppm at 53° C. | 5190 | 4730 | 4590 | 4485 | 3420 |

TABLE 3b

| | Weight of CAC, gm | | | | | |
|---|---|---|---|---|---|---|
| | 0.500 | 1.00 | 2.00 | 3.00 | 4.00 | 5.00 |
| Equilibrium conc. of chromium ions, ppb at 23° C. | 379.2 | 367.1 | 345.6 | 326.3 | 309.3 | 293.1 |

TABLE 3b-continued

| | Weight of CAC, gm | | | | | |
|---|---|---|---|---|---|---|
| | 0.500 | 1.00 | 2.00 | 3.00 | 4.00 | 5.00 |
| Equilibrium conc. of iron ions, ppb at 23° C. | (−)899.1* | 780.6 | 719.6 | 665.1 | 615.3 | 573.2 |
| Equilibrium conc. of chromium ions, ppb at 53° C. | 355.1 | 324.5 | 277.1 | 241.4 | 211.6 | 191.3 |
| Equilibrium conc. of iron ions, ppb at 53° C. | (−)887.8* | 732.6 | 647.5 | 585.3 | 520.8 | 477.1 |

*The minus (−)in the concentration means the increase of the component of mineral.

Equilibrium studies of Adsorption with SGL Carbon Adsorbents for organics removal: The equilibrium parameters for organics removal were studied from batch adsorption experiments. Different weights of carbons (0.5-2.0 gm) were added in 20 ml of solution and were allowed to equilibrate for 4 hours at 160 rpm at 23° C.-53° C. The batch adsorption experiment was conducted at 23° C. with 50 weight % MDEA and 4 weight % DEA solutions. The analyses were performed by acid-base titration using Titrando 907, Metrohm. It was observed that % removal of MDEA was 1.0% with varying adsorbent dosage while maximum adsorptive removal of DEA was 36.275% using 2.0 gm SGL carbon. Table 4 shows the concentrations obtained for DEA using SGL carbon at different temperatures.

TABLE 4

| | Weight of Carbon, gm | | | |
|---|---|---|---|---|
| | 0.50 | 1.00 | 1.50 | 2.00 |
| Equilibrium conc. of DEA, at 23° C. | 3.537 | 3.135 | 2.803 | 2.549 |
| Equilibrium conc. of DEA, at 38° C. | 3.599 | 3.233 | 2.922 | 2.692 |
| Equilibrium conc. of DEA, at 53° C. | 3.655 | 3.340 | 3.071 | 2.832 |

The samples were also acquired on the Liquid Chromatography Time of Flight (LC-TOF) instrument by Perkin Elmer. The instrument was equipped with an HPLC pump and an auto sampler. An HPLC separation using a HILIC mode was employed to separate the components. The sample was analyzed by electrospray ionization in positive ion mode. The HPLC Conditions are: Solvent A: Acetonitrile: 0.1% formic acid, Solvent B: Water: 0.1% formic acid, Column: Atlantis@ HILIC Silica, 100×2.1 mm 3.0 μm particle size, Temperature: 25° C., Injection Volume: 5 μL.

The Mass Spectrometer Conditions are: Instrument: Time of Flight, Mass Range (m/z): 50-1000, Tune Method—Parameters: Electrospray Positive ion, Running mode: Pulse, Capillary exit voltage: 120 Volts, Heater Temperature: 300° C., Detector Voltage: 3100 Volts.

The % removal of 38.535 was observed using LC-TOF instrument for 2.0 gm SGL carbon and nearly equal with auto-titration.

Adsorption Test in Column Using Calcium Alginate-Kaolinite (CAK) Adsorbents:

For continuous adsorption studies, a pyrex column of 2.54 cm inner diameter and 10 cm height was used. Twenty five grams of CAK beads was packed in the column to a bed volume (BV) of 21 cm³. The organic acid anion containing lean MDEA solution was fed to the bottom of the column by a peristaltic pump at a flow rate of 1.0 ml/min. Samples were withdrawn periodically from the top of the column for total organic acid content estimation using the test kit of UV-VIS spectrophotometer. At the beginning of the continuous column studies, the initially extruded organic acid concentration was found to be zero which began to rise as time elapsed. The run continued until the exit phase organic acid concentration became close to the inlet and the breakthrough curve is achieved. Table 5 shows the concentrations of organic acid anions from top of the outlet column after adsorption with lean MDEA from different batch (organic acid concentration, 3415 ppm).

TABLE 5

| Time, minutes | Outlet concentration, ppm |
|---|---|
| 1 | 0 |
| 3 | 0 |
| 5 | 0 |
| 7 | 40 |
| 9 | 110 |
| 10 | 165 |
| 15 | 505 |
| 25 | 1295 |
| 30 | 1620 |
| 40 | 2250 |
| 50 | 2625 |
| 60 | 2965 |
| 75 | 3135 |
| 90 | 3310 |
| 105 | 3350 |
| 120 | 3410 |
| 135 | 3420 |

Adsorption Test in Column Using Calcium Alginate-Quartz (CAQ) Adsorbents:

Similarly for continuous adsorption studies with CAQ beads, twenty five grams of CAQ beads was packed in the column. The run of lean MDEA continued until the exit phase organic acid concentration became close to the inlet and the breakthrough curve is achieved. Table 6 shows the concentrations of organic acid anions from top of the outlet column after adsorption with lean MDEA from different batch (organic acid concentration, 3415 ppm).

TABLE 6

| Time, minutes | Outlet concentration, ppm |
|---|---|
| 1 | 0 |
| 3 | 0 |
| 5 | 0 |
| 7 | 35 |
| 9 | 120 |
| 10 | 180 |
| 15 | 540 |
| 20 | 1100 |
| 25 | 1710 |
| 30 | 2100 |
| 35 | 2370 |
| 40 | 2630 |
| 50 | 2955 |
| 60 | 3080 |
| 90 | 3140 |
| 120 | 3150 |

Adsorption Test in Column Using Calcium Alginate-Activated Carbon (CAC) Adsorbents:

Similarly, column studies were performed with CAC type beads. Table 7a shows the concentrations of organic acid anions from top of the outlet column after adsorption with lean MDEA from different batch (organic acid concentration, 5460 ppm) and Table 7b shows chromium and iron concentration from outlet.

TABLE 7a

| Time, minutes | Outlet concentration, ppm |
| --- | --- |
| 0 | 0 |
| 3 | 0 |
| 5 | 90 |
| 7 | 320 |

TABLE 7a-continued

| Time, minutes | Outlet concentration, ppm |
| --- | --- |
| 10 | 850 |
| 15 | 1355 |
| 30 | 2605 |
| 60 | 3990 |
| 90 | 4780 |
| 120 | 5250 |
| 135 | 5360 |
| 150 | 5410 |
| 165 | 5460 |

TABLE 7b

| | Time, minutes | | | | |
| --- | --- | --- | --- | --- | --- |
| | 0 | 5 | 15 | 30 | 50 | 90 |
| Cr, ppb | 0 | 63.6 | 170.3 | 231.1 | 252.5 | 284.7 |
| Fe, ppb | 0 | 207.8 | 291.4 | 383.3 | 511.5 | 619 |

Regeneration Test for Calcium Alginate-Activated Carbon (CAC) Adsorbents:

Regeneration efficiency of the adsorbent is an important parameter which decides the nature of the adsorption process. The adsorption-desorption cycle was repeated 7 times using 0.05% (w/v) $CaCl_2$ solution as a regenerating solution. The organic acid anions and metal ions adsorbed on 2.0 gm of the CAC beads adsorbent were desorbed by washing thrice with 0.05% (w/v) $CaCl_2$. At 23° C., the CAC beads (7 cycles) were successfully regenerated with a reduction in adsorption capacity of 1.0% for organic acid anions. The changes in the equilibrium uptake of organic acid anions and heavy metal ions like chromium and iron were studied till 7 cycles of regenerating CAC beads. After the seven adsorption-desorption cycles, the regenerated CAC beads did not show any significant decrease of sorption capacity and major deterioration. As the temperature of batch adsorption studies increased, the CAC beads were successfully regenerated with 0.05% (w/v) $CaCl_2$ having temperature similar to that of the adsorption temperature.

After regeneration, the CAC beads were dried by keeping in oven at 60° C. and reused for further adsorption-desorption cycles. It was observed that even after 7 cycles of adsorption-desorption, the variation of residual concentration for organic acid anions were 1.0% in CAC showing the extended usefulness of carbon impregnated calcium alginate (CAC) beads. Table 8 shows the concentration of organic acid anions concentrations (Initial concentration of organic acid anions, 5460 ppm) and heavy metal ions concentration (chromium; 391.8 ppb and iron; 847.1 ppb in lean MDEA) after regeneration.

TABLE 8

| | Adsorption-desorption cycles | | | | | | |
| --- | --- | --- | --- | --- | --- | --- | --- |
| | 1 | 2 | 3 | 4 | 5 | 6 | 7 |
| Equilibrium conc. of organic acid anions, ppm with CAC at 23° C. | 4425 | 4440 | 4445 | 4450 | 4455 | 4470 | 4475 |
| Equilibrium conc. of chromium, ppb with CAC at 23° C. | 345.6 | 347.3 | 351.9 | 353.5 | 355.2 | 356.8 | 358.4 |
| Equilibrium conc. of iron, ppb with CAC at 23° C. | 719.6 | 727.0 | 734.3 | 740.4 | 747.4 | 751.8 | 758.3 |

The kinetics of desorption of CAC bead using water as desorbing agent was observed for organic acid anions. After adsorption of organic acid anions with 2.0 gm CAC beads, the desorption in 10 ml of water was carried out in water bath shaker at 160 rpm and 23° C. as shown in Table 9. It was observed that after 30 minutes total organic acid anions were almost removed from the CAC beads.

TABLE 9

| Time, minutes | Amount of Organic acid, ppm |
| --- | --- |
| 0 | 337 |
| 5 | 734 |
| 10 | 841 |
| 15 | 891 |
| 30 | 1030 |

Identification of Features & Characteristics Provided by the Invention:

1. A method of treating lean MDEA for removal of organic acid anions which comprises contacting contaminated lean MDEA with CAK and CAQ adsorbent prepared by a process comprising adding drop-wise a mixed solution of 1.0 weight % alginate and 1.0 weight % Kaolinite/Quartz to calcium chloride solution to form the desired adsorbent, thereby cross linking sodium alginate with calcium ions and finally get the adsorbents.

2. A method of treating lean MDEA for removal of organic acid anions, heavy metal ions and thermally degraded organic products which comprises contacting contaminated lean MDEA with CAC adsorbent prepared by a process comprising adding drop-wise a mixed solution of 1.0 weight % alginate and 1.0-3.0 weight % activated carbon powder to calcium chloride solution to form an activated carbon impregnated CAC adsorbent, thereby cross linking sodium alginate with calcium ions and finally drying the gel adsorbent with carbon.

3. The method of treating lean MDEA for purification of claims 1 and 2 wherein said alginate is sodium alginate salt.

4. The commercially available activated carbon used for the preparation of CAC was named SGL carbon. The usefulness of using SGL as adsorbent was studied to remove DEA using synthetically prepared 50 weight % MDEA containing 4.0 weight % DEA.

5. The method of treating lean MDEA for removal of organic acid anions, heavy metal ions and thermally degraded organic compounds of claim 2 wherein the contaminated lean MDEA contains contaminants and wherein said mixed solution contains an adsorbent for adsorbing materials.

6. A method of treating lean MDEA for removal of organic acid anions in a column studies, which comprises passing of contaminated lean MDEA through a column containing CAK and CAQ gel adsorbent.

7. A method of treating lean MDEA for removal of organic acid anions and heavy metal ions in a column studies, which comprises passing of contaminated lean MDEA through a column containing CAC gel adsorbent.

8. The method of regeneration of CAC adsorbent and can be stored for long run use.

Technically, the CAC adsorbent is capable of removing total contaminants like organic acid anions, heavy metal ions and thermally degraded organic compounds. Therefore, lean MDEA can be purified and free of any contaminants after adsorption. Thus, absorption efficiency of purified MDEA will be more and hence loss of MDEA due to foaming will be reduced. The requirement of fresh MDEA will be less causing less operational cost. The purified MDEA will effectively reduce the instrument cost causing less capital cost.

The invention indicates two specifically advantageous concepts: a) Total adsorbing of organic and inorganic contaminants from MDEA solvents by modified Calcium Alginates b) desorbing (regeneration) of the adsorbed Calcium Alginate—which, according to the inventors requires more time to complete research on this particular process.

In the presentation set out above, the basic principle of the invention is elucidated. The presentation demonstrates the new technology for removing contaminants from Methyldiethanolamine (MDEA) solvents which is a standard adsorbent in gas sweetening processes. A key component of the challenges are the various types of contaminants such as heat stable salt anions, heavy metal ions and organic compounds.

This invention introduces a modified alginate biopolymer, Calcium Alginate gel combined with fillers such as activated carbon (CAC), which is capable of totally removing organic as well as inorganic (heavy metal) contaminants from MDEA solvents. Different material systems had been tested with CAC to be the most efficient and stable combination.

A second important and preferred aspect of the invention is the regeneration of the Calcium Alginate with filler. The desorbing of adsorbed contaminants from the Calcium Alginate with fillers is by way of washing; different agents such as water and $CaCl_2$) can be applied. The final number of desorbing cycles depend on the washing agent used with $CaCl_2$ being the best agent in the studies carried out.

The invention claimed is:

1. A method of treating a liquid for removal of organic acid anions which comprises contacting a liquid containing organic acid anions with an adsorbent comprising calcium alginate-kaolinite (CAK) or calcium alginate-quartz (CAQ).

2. The method of claim 1 wherein the adsorbent is prepared by a process comprising adding drop-wise a mixed solution of alginate and kaolinite or quartz to a calcium chloride solution, thereby cross linking alginate with calcium ions and to obtain polymeric hybrid gel beads of CAK or CAQ as adsorbent.

3. The method of claim 1 which comprises passing of said liquid containing organic acid anions through a column containing said adsorbent in gel form.

4. A method of treating a liquid for removal of organic acid anions, heavy metal ions and thermally degraded organic products which comprises contacting a liquid containing organic acid anions, heavy metal ions and thermally degraded organic products with an adsorbent comprising calcium alginate-activated carbon (CAC).

5. The method of claim 4 wherein the adsorbent is prepared by a process comprising adding drop-wise a mixed solution of alginate and activated carbon powder to calcium chloride solution to form a carbon impregnated CAC adsorbent.

6. The method of claim 4 which comprises passing of said liquid containing organic acid anions, heavy metal ions and thermally degraded organic products through a column containing said adsorbent in gel form.

7. The method of claim 1 wherein said absorbent comprises an alginate solution prepared using is-sodium alginate salt.

8. The method of claim 1 wherein said liquid is methyldiethanolamine.

* * * * *